US012700902B2

(12) United States Patent
Santra et al.

(10) Patent No.: US 12,700,902 B2
(45) Date of Patent: Aug. 4, 2026

(54) SPECTRAL AND SPATIAL STITCHING FOR RADIO FREQUENCY SENSING

(71) Applicant: Cypress Semiconductor Corporation, San Jose, CA (US)

(72) Inventors: Avik Santra, Irvine, CA (US); Kiran Uln, Pleasanton, CA (US); Rakesh Taori, McKinney, TX (US); Niall Lyons, Irvine, CA (US); Ashutosh Pandey, Irvine, CA (US)

(73) Assignee: Cypress Semiconductor Corporation

( * ) Notice: Subject to any disclaimer, the term of this patent is extended or adjusted under 35 U.S.C. 154(b) by 205 days.

(21) Appl. No.: 18/514,687

(22) Filed: Nov. 20, 2023

(65) Prior Publication Data

US 2025/0167846 A1 May 22, 2025

(51) Int. Cl.
 *H04B 7/01* (2006.01)
 *H04B 7/06* (2006.01)
(52) U.S. Cl.
 CPC ............. *H04B 7/0626* (2013.01); *H04B 7/01* (2013.01)

(58) Field of Classification Search
 CPC .......... H04B 7/01; H04B 7/06; H04B 7/0626; H04B 17/30; H04B 17/391; H04J 13/00; H04L 5/00; H04L 25/02; H04L 41/16; H04W 24/02; H04W 64/00; H04W 80/02; H04W 88/02
 USPC ................ 375/219, 260, 262, 267, 295, 316
 See application file for complete search history.

(56) References Cited

U.S. PATENT DOCUMENTS

| | | | |
|---|---|---|---|
| 2024/0214165 A1* | 6/2024 | Merlin | H04L 25/0224 |
| 2024/0406679 A1* | 12/2024 | Hirzallah | G01S 5/0036 |
| 2025/0274799 A1* | 8/2025 | Shibaike | H04B 7/0478 |

* cited by examiner

*Primary Examiner* — Shawkat M Ali

(57) ABSTRACT

Methods and systems for communication and sensing systems. The disclosed method includes, among other things, responsive to receiving a plurality of channel frequency response (CFR) measurements from an antenna operating at a low-bandwidth range, generating a channel state information (CSI) across a high-bandwidth range based on the plurality of CFR measurements and determining, based on the CSI, a Doppler shift across the high-bandwidth range.

8 Claims, 5 Drawing Sheets

Receive, from an antenna operating at a low-bandwidth range, CFR measurements.

310

Generate, based on the CFR measurements, CSI across a high-bandwidth range.

320

Determine a Doppler shift based on the CSI.

330

400

Receives, from an antenna operating at a low-bandwidth range, CFR measurements.

410

Generate, based on the CFR measurement, a plurality of Doppler traces across the low-bandwidth range.

420

Determine, based on the plurality of Doppler traces across the low-bandwidth range, a Doppler across a high-bandwidth range.

430

500

Receive, from an antenna operating at a low-bandwidth range, CFR measurements.

510

Submit the CFR measurement to a ML model to obtain a channel characterization across a high-bandwidth range.

520

SPECTRAL AND SPATIAL STITCHING FOR RADIO FREQUENCY SENSING

TECHNICAL FIELD

This disclosure relates to wireless devices and, more specifically, to spectral and spatial stitching for radio frequency sensing.

BACKGROUND

Radio frequency (RF) sensing and localization which sense and/or localize individuals within a space can be employed in many applications and, in particular, can be employed by wireless devices. Typically, the wireless devices are configured with Wi-Fi™ technology or IEEE 802.11 standards, but can also relate to wireless devices communicating over other wireless local-area networks (WLAN) or Personal Area Network (PAN) technologies, including Bluetooth® (BT), Bluetooth® Low Energy (BLE), Zigbee®, infrared, and the like. In some cases, such wireless devices can employ PAN technologies (e.g., Wi-Fi™) as a radar device that can detect other objects, including people.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
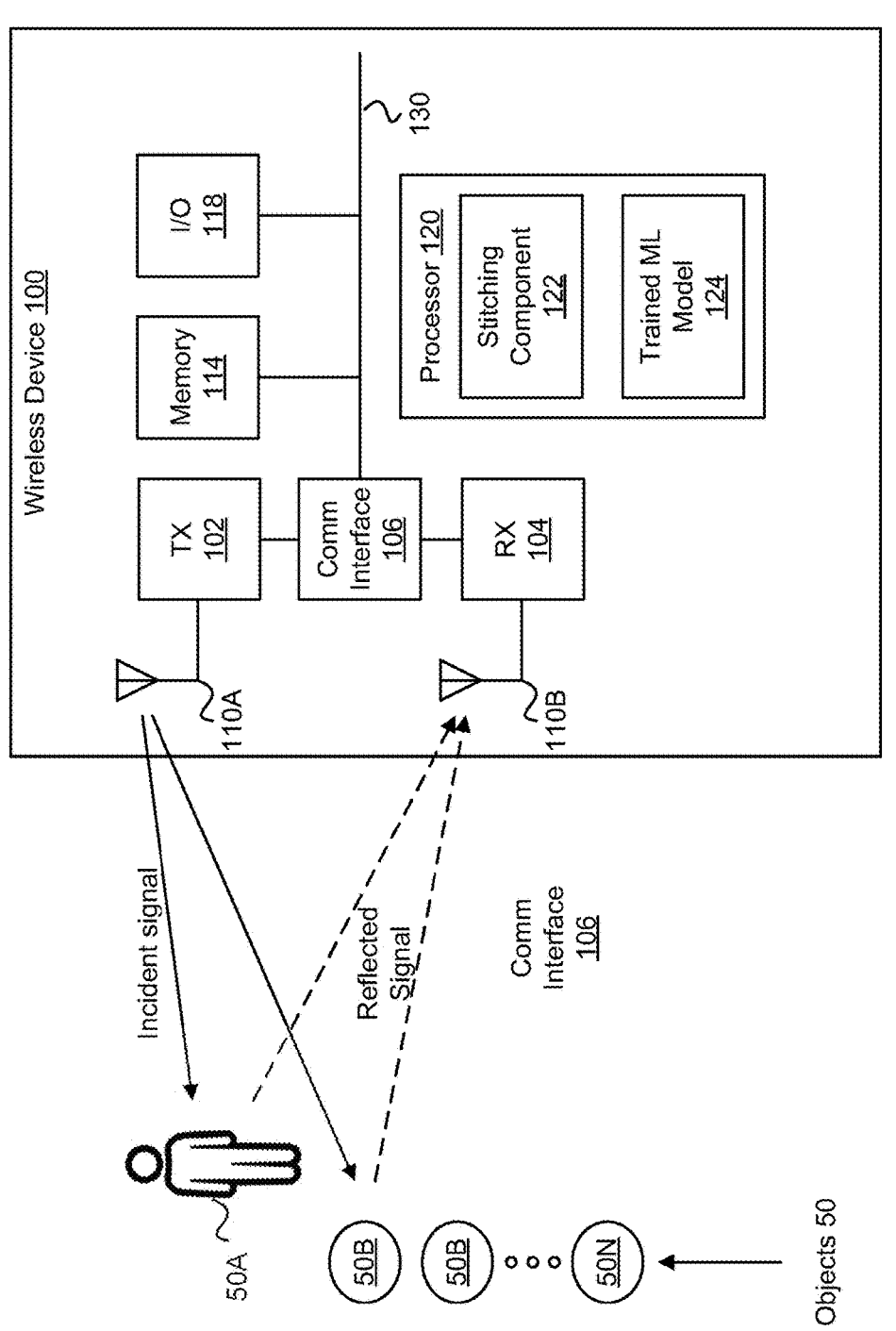
FIG. 1 is a block diagram of an exemplary wireless device configured for RF sensing and localization of static objects according to an example embodiment.

Aspects of the present disclosure relate to spectral and spatial stitching for radio frequency (RF) sensing. Wireless devices leverage the emitted RF signals to gather information and infer various insights without the need for dedicated sensors or additional infrastructure. RF signals, when emitted, may experience changes and distortions as they interact with objects, people, or the environment. These changes, caused by reflections, diffractions, and absorption of the RF signals, can be analyzed and interpreted to extract useful information. By monitoring the variations in RF signals, wireless devices may be enabled to perform detection and tracking of movements, presence, gestures, breathing patterns, object interactions, and other physical phenomena. Wireless devices utilize channel state information (CSI) and/or other parameters of RF signals, such as received signal strength (RSSI), to extract meaningful data. CSI utilized by the wireless device may contain noise, such as high-bandwidth noise. Typically, noise arises from various sources, such as PLL (Phase-Locked Loop) Phase Offset, residual carrier frequency offset, and imperfections induced by AGC (Automatic Gain Control) operations.

Wireless devices may be configured based on the specific requirements for sensing and localization. Selecting the number of antennas and/or the operating bandwidth of the antennas of the wireless device assists in meeting the specific requirements. The operating bandwidth of the antennas of the wireless device determine the resolution and accuracy of sensing and localization. For example, the higher the operating bandwidth (e.g., 80, 160, or 320 MHZ), the finer the resolution, thus providing better detection and tracking of small movements and/or gestures. On the other hand, the lower the operating bandwidth (e.g., 20 MHZ), the coarser the resolution, thus reducing the detection and tracking of small movements and/or gestures. The number of antennas of the wireless device affects the spatial resolution of the sensing and localization. For example, with more antennas (e.g., 4 antennas) in the wireless device, the wireless device can capture a more comprehensive view of the environment, thus providing improved resolution and accuracy. For example, a large scale of CSI from the antennas at different channels may be used to maximize sensing and localization. On the other hand, with limited antennas (e.g., 1 antenna) in the wireless device, the wireless device only captures one view of the environment, thus limiting the resolution of the sensing and localization.

While wireless devices with more antennas and/or increasing the operating bandwidth of the antennas of the wireless device provide accuracy, resolution, and overall performance of sensing and localization, the wireless device may be costly and complex and increase power consumption, impacting battery life and overall energy efficiency.

Aspects and embodiments of the present disclosure address these and other limitations of the existing technology by enabling systems and methods of utilizing wireless devices with limited antennas and/or antennas operating at lower bandwidths to obtain the same performance as wireless devices with more antennas and/or antennas operating at higher bandwidths.

In particular, channel frequency responses (CFR) measurements are obtained from different channels of an antenna at various times (or multiple antennas at various times). As noted above, the antenna(s) operate at a low-bandwidth range (e.g., 20 MHz). In some embodiments, a CSI measurement or Doppler trace across a high-bandwidth range (e.g., 80 MHz) is predicted from the CFR measurements obtained at the low-bandwidth range of the antenna(s).

The prediction of the CSI measurement and/or Doppler trace across the high-bandwidth range is based on the time coherence of the channel characteristics over time and the correlation between the spatial and frequency domains. Time coherence refers to the stability of the channel characteristics over time, indicating that the channel conditions remain relatively constant within a certain time duration and change slowly. The correlation between the spatial and frequency domains refers to the interaction between spatial variations and frequency-selective channel effects. The spatial domain relates to the physical location, orientation, and movement of devices, while the frequency domain represents the distribution of signal power across different frequencies. Analyzing channel measurements in both domains allows for a comprehensive understanding of how the channel response varies spatially and with different frequencies. In other words, due to the time coherence and the spatial and frequency domains correlation, CSI measurements and/or Doppler trace across a higher bandwidth can be predicted.

Aspects of the present disclosure overcome these deficiencies and others by predicting CSI or Doppler trace across a higher bandwidth range, thereby increasing the performance of sensing and localization with limited frequency bandwidth and/or antenna(s).

FIG. 1 is a block diagram of an exemplary wireless device 100 configured for spectral and spatial stitching for RF sensing and localization according to an example embodiment. In at least some embodiments, the wireless device 100 includes, but is not limited to, a transmitter (TX) 102 (e.g., a PAN transmitter), a receiver (RX) 104 or RX (e.g., a PAN receiver), a communications interface 106, a transmitter (TX) antenna 110A coupled to the transmitter 102, an receiver (RX) antenna 110B coupled to the receiver 104, a memory 114, one or more input/output (I/O) devices 118 (such as a display screen, a touch screen, a keypad, and the like), and a processor 120. These components can all be coupled to a communications bus 130. In some embodiments, aspects of the communication interface 106 work with the processor 120 to perform operations or that function as a processing device of the wireless device 100. In some embodiments, there is a single antenna and multiplexing logic to switch the use of the antenna between the transmitter and receiver.

RX antenna 110B may include a plurality of non-overlapping channels across a specific frequency band of the wireless device. For example, for a 2.4 GHz band, the plurality of channels are numbered from 1 to 14. Each of the plurality of channels has a specific center frequency and a channel bandwidth. The center frequency represents the midpoint of the bandwidth range allocated to that channel. For example, for the 2.4 GHz band, the center frequency can be a value between 2.412 GHz and 2.484 GHz. The channel bandwidth indicates that the channel occupies a specific bandwidth range centered around the assigned center frequency. For example, for the 2.4 GHz band, the channel bandwidth may be from 20 MHz (e.g., low-bandwidth range) up to 320 MHz (e.g., high-bandwidth range). Within the channel bandwidth, multiple subcarriers (e.g., 56) are allocated and spaced apart evenly across the channel bandwidth. For example, for a channel bandwidth of 20 MHz (or 20 MHz channel), subcarriers are spaced 312.5 kHz apart.

In at least some embodiments, the memory 114 includes storage to store instructions executable by the processor 120 and/or data generated by the communication interface 106. In various embodiments, frontend components such as the transmitter 102, the receiver 104, the communication interface 106, and the one or more antenna 110 described herein within various devices are adapted with or configured for WLAN and PAN-based frequency bands, e.g., Bluetooth® (BT), BLE, Wi-Fi™, Zigbee®, Z-wave™, and the like.

In various embodiments, the communications interface 106 is integrated with the transmitter 102 and the receiver 104, e.g., as a frontend of the wireless device 101. The communication interface 106 may coordinate, as directed by the processor 120, to request/receive packets from other wireless devices or those that reflect from objects and/or humans. The communications interface 106 can further process data symbols received by the receiver 104 in a way that the processor 120 can perform further processing, including object detection and location tracking. In some embodiments, the processing may process an RF signal spectrum or heat map (e.g., data arrays) in order to interpret particular RF signals referred to as channel state information (CSI) and/or return signal strength information (RSSI), which include channel properties of a communication link. The CSI/RSSI data, for example, describes how an RF signal propagates from the transmitter 102 to the receiver 104 and represents the combined effect of, for example, scattering, fading, and power decay with distance which is representative of a dynamic nature of the channel. The method by which CSI is measured is called channel estimation.

In these embodiments, there may exist a number of objects 50, which can include humans, in the environment of and within the RF range of the wireless device 100. Objects 50 can include humans 50A as well as other objects 50B-50N that are generally understood to be static objects. The RF range may differ depending on the type of WAN or PAN technology being used at any given time by the wireless device 100. In some embodiments, the transmitter 102 radiates RF signals which cause reflections off of one or more of the objects 50, creating reflective RF signals received by the receiver 104, and that may include CSI/RSSI data.

In these embodiments, the wireless device 100 (also referred to herein as the detecting RF wireless device) can process data arrays of either the reflective RF signals or active RF signals (also referred to as received RF signals) to perform RF sensing to detect the presence of one or more of the object 50 and to determine a distance away from the wireless device 100, e.g., in relation to the RX antenna 110B. Determining the distance away may be understood as localization of the objects 50, which locations may be stored in the memory 114 and referenced at later times to aid in the disclosed algorithms and methods deployed to differentiate the objects 50 from each other, e.g., in order to accurately determine the number and type of objects detected.

Processor 120 may further include a stitching component 122 and machine learning (ML) models 124. Stitching component 122, in which there is a single receiver, may obtain channel frequency response measurements (e.g., CFRs) from different channels of antenna 110B with a low operating bandwidth (e.g., 20 MHz) and at various times to generate a CFR or channel state information (CSI) across a high-bandwidth range (e.g., 80, 160, or 320 MHz) for sensing and localization, as will be discussed in detail. Stitching component 122, in which there are multiple receivers, each with a low operating bandwidth (e.g., 20 MHz), may obtain CFRs from different receivers at various times to predict a CSI (or features extracted from CSI such as, wavelet/time-frequency transform, etc.) or Doppler trace across a high-bandwidth range (e.g., 80, 160, or 320 MHz), as will be discussed in detail. Depending on the embodiment, processor 120 may include machine learning (ML) model 124 to assist in generating the CFR, CSI, or Doppler trace across the high-bandwidth range.

Figure 2:
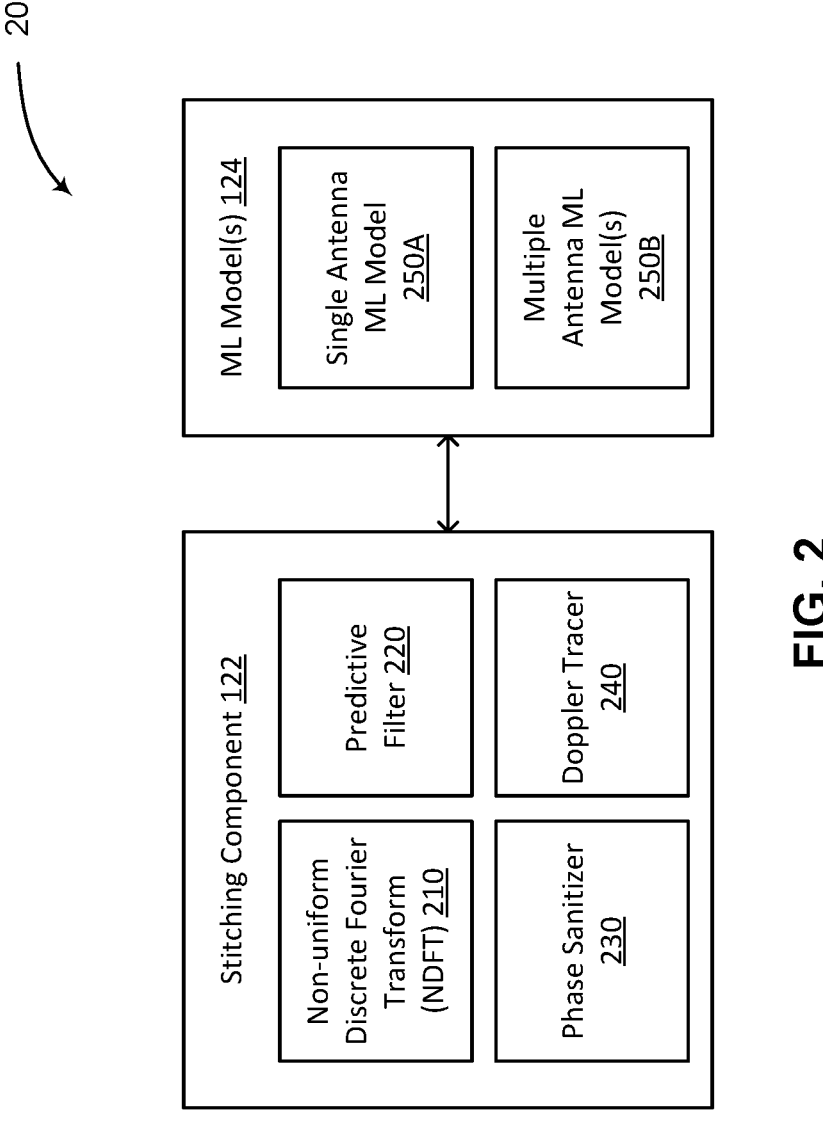
FIG. 2 is a simplified block diagram of a stitching component of the wireless device, in accordance with implementations of the present disclosure.

FIG. 2 is a simplified block diagram 200 of a stitching component of the wireless device (e.g., stitching component 122 of FIG. 1), in accordance with implementations of the present disclosure. Stitching component 122 may include a Non-uniform Discrete Fourier Transform (NDFT) 210, a predictive filter 220, a phase sanitizer 230, and a doppler tracer 240.

Stitching component 122 may receive a plurality of CFRs. Each CFR of the plurality of CFRs is a frequency-domain representation of a channel's characteristics indicating how the channel affects the transmitted RF signal across different frequencies. Each CFR associated with a channel is a collection of subcarrier CFRs. A subcarrier CFR is a CFR obtained from a subcarrier of the channel. The plurality of CFRs is obtained from different channels of the plurality of channels of antenna 110B of FIG. 1 at various times. The channel bandwidth of the plurality of channels may be 20 MHz (e.g., a low-bandwidth range). In other words, the plurality of CFRs are obtained from the low-bandwidth range (e.g., 20 MHz) across multiple carrier frequencies.

In one embodiment, stitching component 122 may select, from the plurality of CFRs, a plurality of subcarrier CFRs. Stitching component 122 selects, from each CFR of the plurality of CFRs, a subset of the collection of subcarrier CFRs associated with a respective CFR. Stitching component 122 determines a number of subcarrier CFRs from the collection of subcarrier CFRs associated with the respective CFR to select based on an age of the respective CFR. For example, the newer the respective CFR, the more subcarrier CFRs of the collection of subcarrier CFRs associated with the respective CFR are selected, and the older the respective CFR, the fewer subcarrier CFRs of the collection of subcarrier CFRs associated with the respective CFR is selected. In some embodiments, stitching component 122 may use a weight value, which is applied to the number of subcarrier CFRs in the collection of subcarrier CFRs, to assist in selection. Stitching component 122 may provide the plurality of selected subcarrier CFRs to the NDFT 210 of the stitching component 122.

NDFT 210 is configured to generate CFRs across a higher bandwidth range from CFRs non-uniformly sampled in the frequency domain. In particular, NDFT 210 reconstructs a time-domain RF signal from non-uniformly sampled CFRs. NDFT 210 may estimate values between and outside the non-uniformly sampled CFRs using interpolation and/or extrapolation. Thus, NDFT 210 may provide CFRs across a higher bandwidth range (e.g., 80, 160, or 320 MHz).

Stitching component 122 may derive, from the CFRs across the high-bandwidth range, a CSI across the high-bandwidth range. CSI provides information that is used to characterize the combined effect of channel gain, phase shifts, frequency response, noise levels, path loss, scattering, diffraction, fading, shadowing, etc. when an RF signal propagates from the transmitter to the receiver. Stitching component 122 may generate, based on the CSI, a Doppler trace that represents the Doppler effect (or Doppler shift) observed from the CSI over time. Doppler effect occurs when there is relative motion between a transmitter and a receiver of the wireless device. Doppler effect typically introduces variation in the CSI due to movement of an object or human target which assist in sensing operation. The Doppler trace can reveal the speed, direction, and time-varying characteristics of the channel.

In another embodiment, stitching component 122 may provide the plurality of CFRs to the predictive filter 220 of the stitching component 122. Predictive filter 220, such as a Kalman predictive filter, is a recursive algorithm used to estimate and/or predict future values of an RF signal based on past observations or measurements (e.g., the plurality of CFRs). In particular, a low bandwidth (e.g., 20 MHz) includes a predetermined number of subcarriers associated with the low bandwidth (e.g., 64 subcarriers), similarly a higher bandwidth (e.g., 80 MHz) includes a predetermined number of subcarriers associated with the higher bandwidth (e.g., 256 subcarriers). The predictive filter 220 includes a predetermined number of dimensional states (e.g., 512 dimensional states), which can be estimated. In some embodiments, each dimensional state of the predetermined number of dimensional states is represented by [CSI, $\Delta$CSI], where CSI represents the complex value across each sub-carrier across the predetermined number of subcarriers associated with the higher bandwidth (e.g., 256 subcarriers).

Accordingly, the predictive filter 220, at a given time, the CSI of the predetermined number of subcarriers associated with the low bandwidth (e.g., 64 subcarriers) are measured. The predictive filter 220 implements a constant velocity model to model how the CSIs of each of the remaining subcarriers (e.g., 256 subcarriers minus the 64 subcarriers) vary across time. An uncertainty matrix is initialized with a multiplier (e.g., 0.2) of the identity matrix to learn the confidence over time. The predictive filter 220 gain helps to strike a balance between measurement and prediction based on the confidence dictated by corresponding entries of the uncertainty matrix. The predictive filter 220 utilizes a state space model to capture the global relation of varying sub-carriers and their local relation from its subcarrier neigh-borhood.

In another embodiment, stitching component 122 may provide the plurality of CFRs to a machine learning model of the ML model(s) 124 of FIG. 1 (e.g., a single antenna ML model 250A). The single antenna ML model 250A may be configured to generate a CSI across the high-bandwidth range based on the plurality of CFRs. The single antenna ML model 250A may include an initial fully connected layer (FCN), a Long Short-Term Memory (LSTM), and a final FCN.

FCNs refer to an architecture in which every neuron in the layer is connected to every neuron in the previous layer. Each neuron also referred to as perceptron, unit, or node, is a mathematical function that collects and classifies informa-tion. In some instances, the neuron obtains weighted values, performs mathematical calculations, and produces output. Each neuron receives inputs from all the neurons in the preceding layer and produces an output value based on a weighted sum of these inputs representing the parameters of the model that are learned during the training process. The output of each neuron in a fully connected layer is typically passed through an activation function, such as a sigmoid, rectified linear unit (ReLU), or hyperbolic tangent function to mitigate against non-linearity. Typically, FCNs used as the last few layers of an ML model transform high-level features learned in the preceding layers into a meaningful outputs.

LSTM is a type of recurrent neural network (RNN) designed to capture long-term dependencies in sequential data. LSTM provides memory cells within the network to selectively store, access, and update information over time. Memory cells consist of four main components: the cell state (Ct), input gate (i), forget gate (f), and output gate (o). The cell state acts as the long-term memory and runs through the entire sequence. The input gate controls the flow of new information into the cell state, deciding which information is stored. The forget gate determines which information should be discarded or forgotten from the cell state. The output gate regulates the flow of information from the cell state to the output or the next hidden state. By selectively storing and updating information in the memory cells, LSTMs can effectively capture and remember long-term dependencies in the sequential data. The LSTM can be trained to predict or filter future observations based on past data, which generates a sequence of predicted values representing future points in the time series.

Responsive to receiving, by the single antenna ML model 250A, the plurality of CFRs, the initial FCN of the single antenna ML model 250A assists in mitigating against non-linearity of the plurality of CFRs. The output of the initial FCN is forwarded to the LSTM of the single antenna ML model 250A to track and filter the plurality of CFRs across a higher bandwidth range (e.g., 80, 160, or 320 MHz). The output of the LSTM is forwarded to the final FCN, which converts the sequence of predicted values associated with the output of the LSTM into constituent frequencies that make up an RF signal. Depending on the embodiment, the final FCN may be replaced by a Discrete Fourier Transform (DFT) to obtain the constituent frequencies that make up the RF signal.

Stitching component 122 may derive, from the CFRs across the high-bandwidth range, a CSI across the high-bandwidth range. Stitching component 122 may remove and/or mitigate phase ambiguity or inconsistencies in the CSI using various techniques, such as phase unwrapping, reference signal calibration, interpolation or filtering, or channel tracking (e.g., performing phase sanitization). Stitching component 122 may further generate, based on the CSI, a Doppler trace.

In another embodiment, stitching component 122 may derive, for each CFR of the plurality CFRs, a CSI associated with a respective CFR. Stitching component 122 may perform phase sanitization for each of the derived CSIs. Stitching component 122 may further generate, for each of the derived CSIs, a Doppler trace aggregated into a plurality of Doppler traces. Stitching component 122 may provide the plurality of Doppler traces to the single antenna ML model 250A. Responsive to receiving, by the single antenna ML model 250A, the plurality of Doppler traces, the initial FCN of the single antenna ML model 250A assists in mitigating against non-linearity of the plurality of Doppler traces. The output of the initial FCN is forwarded to the LSTM of the single antenna ML model 250A to track and filter the plurality of Doppler traces across a higher bandwidth range (e.g., 80, 160, or 320 MHz). The output of the LSTM is forwarded to the final FCN, which converts the sequence of predicted values associated with the output of the LSTM into constituent frequencies that make up an RF signal. Depending on the embodiment, the final FCN may be replaced by a DFT to obtain the constituent frequencies that make up the RF signal. As a result, the RF signal may be used for further tasks, such as presence sensing, activity sensing, geo-fenced activity sensing, localization, etc.

As previously noted, the wireless device may include a plurality of receivers. Each receiver of the plurality of receivers may operate at 20 MHz (e.g., a low-bandwidth range). Stitching component 122 may receive a CFR from different receivers of the plurality of receivers at various times. Stitching component 122 may derive, for each receiver of the plurality of receivers, a CSI from a CFR associated with the respective receiver.

In an embodiment, stitching component 122 may provide, for each receiver of the plurality of receivers, a CSI associated with a respective receiver to an ML model of ML model 124 (e.g., a multi-antenna ML model(s) 250B). That is, for each receiver of the wireless device, a corresponding multi-antenna ML model 250B receives a CSI associated with the respective receiver. Each multi-antenna ML model 250B may be an LSTM. The multi-antenna ML model 250B may predict, based on the CSI associated with the respective receiver, a portion of a CSI across a higher bandwidth range (e.g., 80, 160, or 320 MHZ). Accordingly, the output of each of the multi-antenna ML model 250B associated with a receiver can be combined to provide a predicted CSI across the higher bandwidth range.

In another embodiment, stitching component 122 may perform, for each receiver of the plurality of receivers, phase sanitization and/or generate a Doppler trace or other features extracted from CSI associated with a respective receiver. Stitching component 122 may provide, for each receiver of the plurality of receivers, a Doppler trace associated with a respective receiver to a ML model of ML model 124 (e.g., a multi-antenna ML model(s) 250). Each multi-antenna ML model 250B may be a LSTM. The multi-antenna ML model 250B may predict, based on the Doppler trace associated with a respective receiver, a portion of a Doppler trace across a higher bandwidth range (e.g., 80, 160, or 320 MHZ). Accordingly, the output of each of the multi-antenna ML model 250B associated with a receiver can be combined to provide a predicted Doppler trace across the higher bandwidth range. In other words, the plurality of CFRs from the low-bandwidth range (e.g., 20 MHz) across multiple carrier frequencies are stitched (using via NDFT 210 or predictive filter 220 to obtain a representative CFR spanning larger bandwidths.

Figure 3:
FIG. 3 depicts a flow diagram of an example method for predicting a Doppler trace across a higher bandwidth range for the wireless device with a single antenna, in accordance with implementations of the present disclosure.
Figure 3:
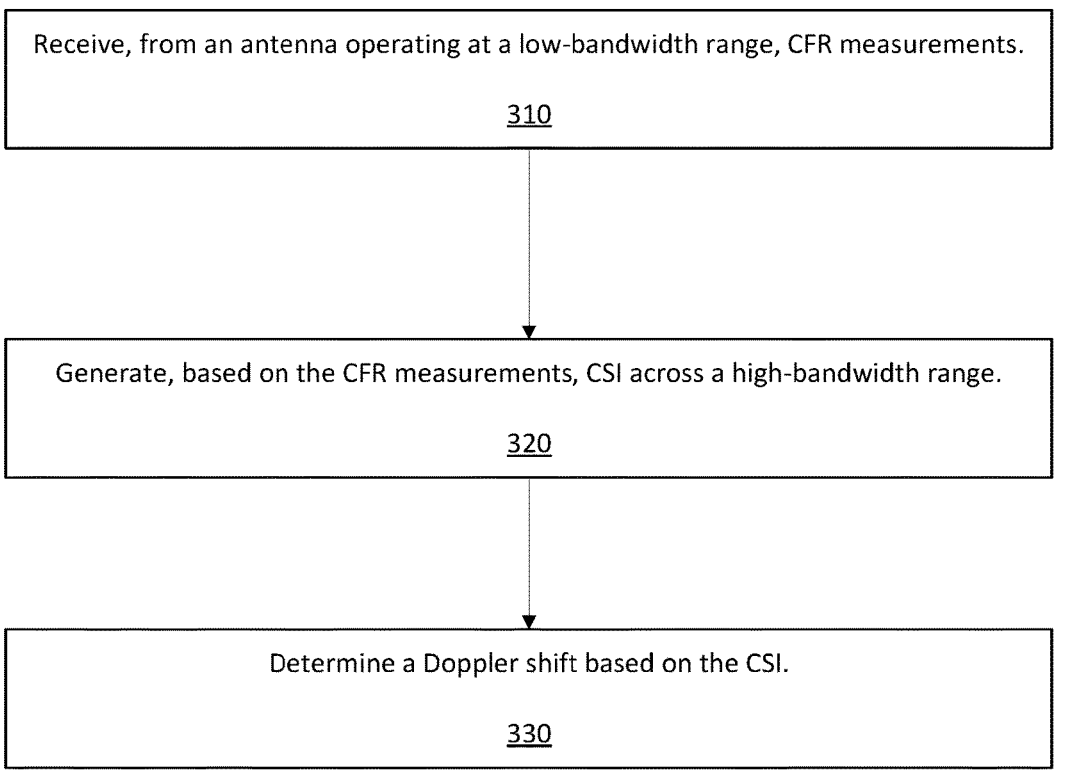

FIG. 3 is a flow diagram of a method 300 of predicting a Doppler trace or other feature extracted from CSI across a higher bandwidth range for the wireless device with a single antenna, in accordance with implementations of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the wireless device 100, including the stitching component 122 and/or the processor 120 (e.g., processing device).

At operation 310, the processing logic receives, from an antenna operating at a low-bandwidth range, CFR measurements.

At operation 320, the processing logic generates, based on the CFR measurements, CSI across a high-bandwidth range. Responsive to receiving the CFR measurements (e.g., plurality of channel frequency response (CFR) measurements) from an antenna operating at the low-bandwidth range, the processing logic generates a channel state information (CSI) across a high-bandwidth range based on the plurality of CFR measurements. Each CFR measurement of the plurality of CFR measurements may be measured from different channels of the antenna at varying times.

In an embodiment, to generate the CSI across the high-bandwidth range, the processing logic identifies a subset of the plurality of CFR measurements. The processing logic obtains, from each CFR measurement of the subset, one or more subcarrier CFR measurements from a plurality of subcarrier CFR measurements of a respective CFR measurement. In some embodiments, to obtain one or more subcarrier CFR measurements, the processing logic determines, for each CFR measurement of the subset, an age of a respective CFR measurement.

The processing logic identifies, based on the age, a number of subcarrier CFR measurements to select from the plurality of subcarrier CFR measurements of the respective CFR measurement. To identify, based on the age, the number of subcarrier CFR measurements to select from the plurality of subcarrier CFR measurements of the respective CFR measurement, the processing logic determines a number of subcarrier CFR measurements associated with the plurality of subcarrier CFR measurements of the respective CFR measurement.

The processing logic applies, based on the age, a weight value to the number of subcarrier CFR measurements to determine the number of subcarrier CFR measurements to select from the plurality of subcarrier CFR measurements of the respective CFR measurement. The processing logic selects, based on the identified number, the one or more subcarrier CFR measurements. As previously described, the newer the respective CFR, the more subcarrier CFRs of the collection of subcarrier CFRs associated with the respective CFR may be selected, and the older the respective CFR, the less subcarrier CFRs of the collection of subcarrier CFRs associated with the respective CFR may be selected. In some embodiments, CFR can be determined based on the measured overall SNR/RSSI.

The processing logic converts one or more subcarrier CFR measurements associated with each CFR measurement of the subset to the CSI across the high-bandwidth range. As previously described, to convert the one or more subcarrier CFR measurements associated with each CFR measurement of the subset to the CSI across the high-bandwidth range, the processing logic provides the one or more subcarrier CFR measurements to an NDFT configured to generate CFRs across a higher bandwidth range from CFRs non-uniformly sampled in the frequency domain.

In another embodiment, to generate the CSI across the high-bandwidth range, the processing logic provides each CFR measurement of the plurality of CFR measurements to a predictive filter. As previously described, the predictive filter may be a recursive algorithm used to estimate and/or predict future values of an RF signal based on the plurality of CFR measurements. Accordingly, the processing logic obtains, from the predictive filter, a plurality of predicted CSIs across the high-bandwidth range and combines the plurality of predicted CSIs across the high-bandwidth range into the measured CSI across the high-bandwidth range.

In yet another embodiment, to generate the CSI across the high-bandwidth range, the processing logic provides the plurality of CFR measurements to a machine learning model and obtains, from the machine learning (ML) model (e.g., single antenna ML model), the CSI across the high-bandwidth range. As previously noted, the ML model may mitigate against the non-linearity of the plurality of CFRs, then track and filter the plurality of CFRs across a higher bandwidth range and convert the sequence of predicted values into constituent frequencies that make up an RF signal.

At operation 330, the processing logic determines a Doppler shift based on the CSI. In other words, the processing logic determines, based on the CSI, a Doppler shift across the high-bandwidth range. The high-bandwidth range (e.g., 80 MHz) may be greater than the low-bandwidth range (e.g., 20 MHz).

Figure 4:
FIG. 4 depicts a flow diagram of an example method for predicting a Doppler trace across a higher bandwidth range for the wireless device with a single antenna, in accordance with implementations of the present disclosure.
Figure 4:
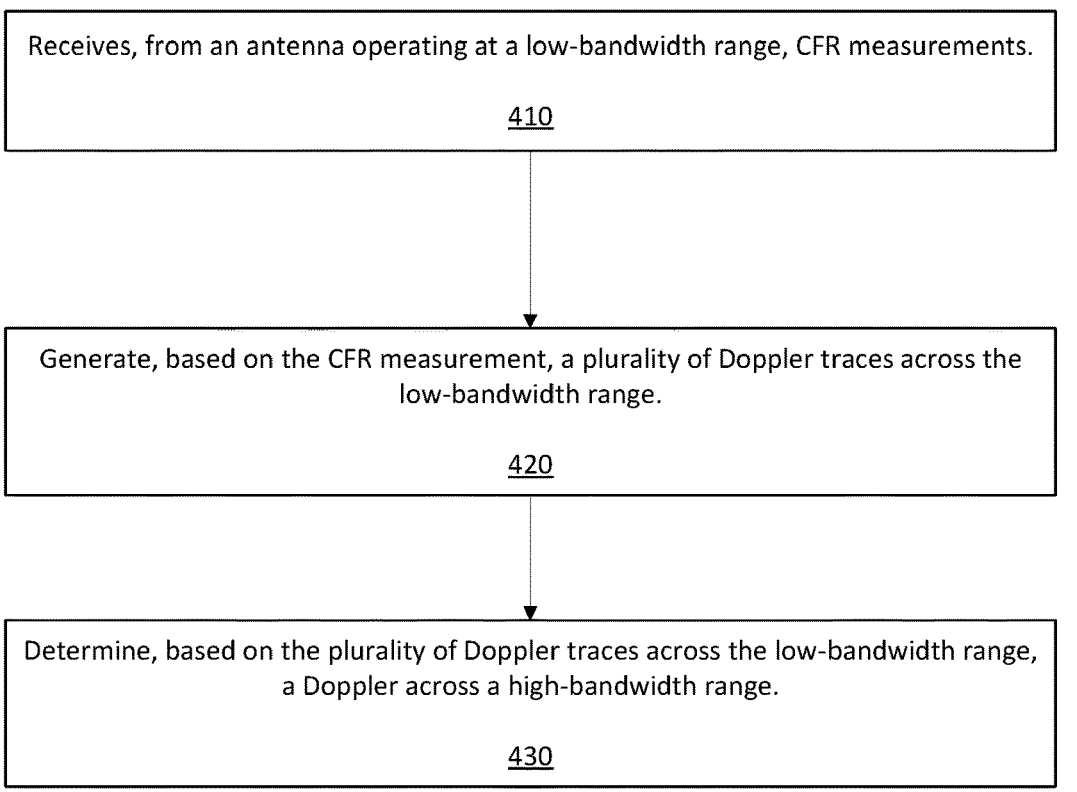

FIG. 4 is a flow diagram of a method 400 of predicting a Doppler trace across a higher bandwidth range for the wireless device with a single antenna, in accordance with implementations of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the wireless device 100, including the stitching component 122 and/or the processor 120 (e.g., processing device).

At operation 410, the processing logic receives, from an antenna operating at a low-bandwidth range, CFR measurements. In other words, a plurality of channel frequency response (CFR) measurements is received from an antenna operating at a low-bandwidth range.

At operation 420, the processing logic generates, based on the CFR measurement, a plurality of Doppler traces across the low-bandwidth range. In other words, for each CFR measurement of the plurality of CFR measurements, a first Doppler trace across the low-bandwidth range is generated. As previously described, to generate the first Doppler trace across the low-bandwidth range, the processing logic determines, based on the plurality of CFR measurements, a channel state information (CSI) of the antenna and determines the first Doppler trace across the low-bandwidth range based on the CSI of the antenna.

At operation 430, the processing logic determines, based on the plurality of Doppler traces across the low-bandwidth range, a Doppler across a high-bandwidth range. In other words, a second Doppler shift across a high-bandwidth range is generated based on the first Doppler trace associated with each CFR measurement of the plurality of CFR measurements. To generate the second Doppler trace, the processing logic provides the first Doppler trace to a machine learning model and obtains the second Doppler trace. The high-bandwidth range (e.g., 80 MHz) may be greater than the low-bandwidth range (e.g., 20 MHz).

Figure 5:
FIG. 5 depicts a flow diagram of an example method for predicting a channel characterization across a higher bandwidth range for the wireless device within multiple antennas, in accordance with implementations of the present disclosure.
Figure 5:
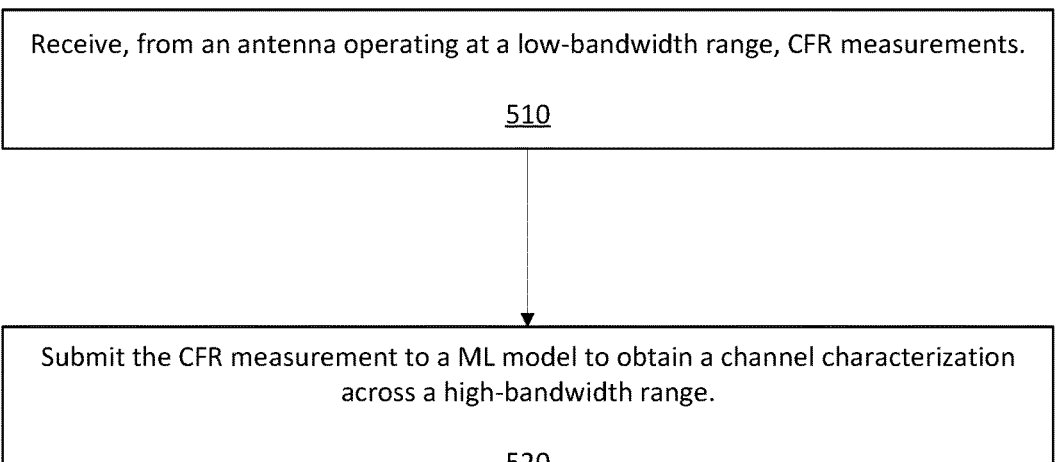

FIG. 5 is a flow diagram of a method 500 of predicting a channel characterization for the wireless device within multiple antennas, in accordance with implementations of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the wireless device 100, including the stitching component 122 and/or the processor 120 (e.g., processing device).

At operation 510, the processing logic receives, from an antenna operating at a first frequency, CFR measurements. In other words, from each antenna of a plurality of antennas of a wireless device operating at a low-bandwidth range, a CFR measurement is received. The CFR measurement associated with each antenna of the plurality of antennas may be measured a varying times. For example, CFR measurement for a first subcarrier is obtained at time T at antenna 1, at time T+1 at antenna 2, at time T+2 at antenna 3, at T+3 at antenna 4, and so on. In some embodiments, measurements are obtained from each antenna by switching between antennas (e.g., via I/O pins).

At operation 520, the processing logic submits the CFR measurement to a ML model to obtain a channel characterization across a high-bandwidth range. In other words, for each CFR measurement associated with an antenna of the plurality of antennas, data related to a respective CFR measurement is provided to a ML model of a plurality of ML models. The data related to the respective CFR measurement may be a CSI measurement or a Doppler trace derived from the CFR measurement. Each machine learning model of the plurality of machine learning models model may be a Long Short-Term Memory (LSTM).

The output of each ML model of the plurality of ML models, is a channel characterization across a portion of the high-bandwidth range. To determine the channel characterization across the high-bandwidth range, the processing logic combines the output of each machine learning model of the plurality of machine learning models into the channel characterization. The high-bandwidth range (e.g., 80 MHz) is greater than the low-bandwidth range (e.g., 20 MHz). The channel characterization may be a CSI or a Doppler trace. For example, the channel characterization is obtained for antennas 1 through 4 at T+3 using all past CSI (or CFR) measurements from T through T+3. Depending on the embodiment, the plurality of ML models can be used to reconstruct the CSI (or CFR) measurements or Doppler trace across a higher bandwidth range based on CSI (or CFR) measurements across different subcarriers to and/or reconstruct the CSI (or CFR) measurements or Doppler trace across multiple antennas based on CSI (or CFR) measurements across different antennas.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, refer to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer-readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include a collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A device comprising:
a transmitter coupled to at least one antenna;
a receiver coupled to the at least one antenna; and
a processing device coupled to the transmitter and the receiver, the processing device for performing operations comprising:
   responsive to receiving a plurality of channel frequency response (CFR) measurements from an antenna operating at a low-bandwidth range, generating, based on the plurality of CFR measurements, a channel state information (CSI) across a high-bandwidth range; and
   determining, based on the CSI, a Doppler shift across the high-bandwidth range.

2. The device of claim 1, wherein each CFR measurement of the plurality of CFR measurements is measured from different channels of the antenna at varying times.

3. The device of claim 1, wherein the high-bandwidth range is greater than the low-bandwidth range.

4. The device of claim 1, wherein generating the CSI across the high-bandwidth range comprises:
identifying a subset of the plurality of CFR measurements;
obtaining, from each CFR measurement of the subset, one or more subcarrier CFR measurements from a plurality of subcarrier CFR measurements of a respective CFR measurement; and
converting the one or more subcarrier CFR measurements associated with each CFR measurement of the subset to the CSI across the high-bandwidth range.

5. The device of claim 4, wherein obtaining, from each CFR measurement of the subset, the one or more subcarrier CFR measurements from the plurality of subcarrier CFR measurements of the respective CFR measurement comprises:

for each CFR measurement of the subset, determining an age of the respective CFR measurement;

identifying, based on the age, a number of subcarrier CFR measurements to select from the plurality of subcarrier CFR measurements of the respective CFR measurement; and selecting, based on the identified number, the one or more subcarrier CFR measurements.

6. The device of claim 5, wherein identifying, based on the age, the number of subcarrier CFR measurements to select from the plurality of subcarrier CFR measurements of the respective CFR measurement comprises:

determining the number of subcarrier CFR measurements associated with the plurality of subcarrier CFR measurements of the respective CFR measurement; and applying, based on the age, a weight value to the number of subcarrier CFR measurements to determine the number of subcarrier CFR measurements to select from the plurality of subcarrier CFR measurements of the respective CFR measurement.

7. The device of claim 1, wherein generating the CSI across the high-bandwidth range comprises:

providing each CFR measurement of the plurality of CFR measurements to a predictive filter;

obtaining, from the predictive filter, a plurality of predicted CSIs across the high-bandwidth range; and combining the plurality of predicted CSIs across the high-bandwidth range into the CSI across the high-bandwidth range.

8. The device of claim 1, wherein generating the CSI across the high-bandwidth range comprises:

providing the plurality of CFR measurements to a machine learning model; and obtaining, from the machine learning model, the CSI across the high-bandwidth range.

* * * * *